United States Patent
Schaefer et al.

(10) Patent No.: US 9,171,113 B2
(45) Date of Patent: Oct. 27, 2015

(54) SYSTEMS AND METHODS FOR SEMICONDUCTOR VOLTAGE DROP ANALYSIS

(71) Applicant: GLOBALFOUNDRIES, Inc., Grand Cayman (KY)

(72) Inventors: Torsten Schaefer, Pulsnitz (DE); Dirk Fimmel, Dresden (DE); Hendrik Thomas Mau, Dresden (DE)

(73) Assignee: GLOBALFOUNDRIES, INC., Grand Cayman (KY)

( * ) Notice: Subject to any disclaimer, the term of this patent is extended or adjusted under 35 U.S.C. 154(b) by 0 days.

(21) Appl. No.: 14/294,705

(22) Filed: Jun. 3, 2014

(65) Prior Publication Data

US 2014/0359551 A1 Dec. 4, 2014

Related U.S. Application Data

(60) Provisional application No. 61/830,384, filed on Jun. 3, 2013.

(51) Int. Cl.
*G06F 11/22* (2006.01)
*G06F 17/50* (2006.01)

(52) U.S. Cl.
CPC ........ *G06F 17/5036* (2013.01); *G06F 2217/78* (2013.01)

(58) Field of Classification Search
CPC ............... G06F 17/5036; H01L 21/823807; H01L 21/823814; H01L 21/82385; H01L 27/0207; H01L 29/7848
USPC ........................ 716/104, 106, 108, 111, 136
See application file for complete search history.

(56) References Cited

U.S. PATENT DOCUMENTS

| | | | |
|---|---|---|---|
| 2002/0045995 A1* | 4/2002 | Shimazaki et al. | 702/77 |
| 2004/0073878 A1* | 4/2004 | Hasegawa et al. | 716/8 |
| 2005/0035893 A1* | 2/2005 | Horsky et al. | 341/153 |
| 2006/0026540 A1* | 2/2006 | Bhooshan et al. | 716/4 |
| 2008/0052654 A1* | 2/2008 | Rahmat et al. | 716/6 |
| 2011/0249770 A1* | 10/2011 | Bellaouar et al. | 375/296 |

* cited by examiner

*Primary Examiner* — Brian Ngo
(74) *Attorney, Agent, or Firm* — Ingrassia Fisher & Lorenz, P.C.

(57) ABSTRACT

Methods and systems are provided for computing IR drop, i.e., voltage drop, in a semiconductor device. The method includes generating a modeling element corresponding to the plurality of transistors. At least one of the transistors in the modeling element is replaced with a current source. The method also includes performing an IR drop analysis of the modeling element utilizing a software program to calculate the IR drop in the semiconductor device.

17 Claims, 7 Drawing Sheets

SYSTEMS AND METHODS FOR SEMICONDUCTOR VOLTAGE DROP ANALYSIS

CROSS-REFERENCES TO RELATED APPLICATIONS

This application claims the benefit of U.S. Provisional Application No. 61/830,384, filed Jun. 3, 2013, which is hereby incorporated by reference.

TECHNICAL FIELD

The technical field relates generally to software analysis of voltage drops in semiconductor devices.

BACKGROUND

Computer modeling of semiconductor devices, e.g., integrated circuits, is commonly used in various development stages of such devices. Determining voltage drops, commonly referred to as IR drops, in semiconductor devices is one analysis that may be performed.

Unfortunately, in large and/or complex semiconductor devices, the voltage drop analysis may be overly cumbersome and time consuming. For example, a 64-megabit ("Mbit") static random access memory ("SRAM") module may include more than 300 million sinks, e.g., transistors, resistors, or other primitive devices. The voltage drop analysis of such a module may take over 512 gigabytes ("GB") of computer memory and several days of run time to process.

Accordingly, it is desirable to provide systems and methods of providing voltage drop analysis of semiconductor devices that are expedient and consume fewer computer resources. Furthermore, other desirable features and characteristics of the present invention will become apparent from the subsequent detailed description of the invention and the appended claims, taken in conjunction with the accompanying drawings and this background of the invention.

BRIEF SUMMARY

A method, according to one embodiment, is provided for computing IR drop in a semiconductor device. The semiconductor device is divided into a plurality of transistors. The method includes generating a modeling element corresponding to the plurality of transistors. The method further includes replacing at least one of the plurality of the transistors with a current source in the modeling element. The method also includes performing an IR drop analysis of the modeling element utilizing a software program.

A system, according to one embodiment, is provided for computing IR drop in a semiconductor device. The semiconductor device is divided into a plurality of blocks and each block includes a plurality of transistors. The system includes a processor and a memory in communication with the processor. The memory is configured to receive a fine modeling element corresponding to at least one fine block of the plurality of blocks. The fine modeling element models at least one of the plurality of transistors of the at least one fine block as a transistor. The memory is also configured to receive a coarse modeling element corresponding to at least one coarse block of the plurality of blocks. The coarse modeling element models at least one of the plurality of transistors of the at least one coarse block as a current source. The processor is configured to perform IR drop analysis of the fine modeling element and the coarse modeling element utilizing a software program.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
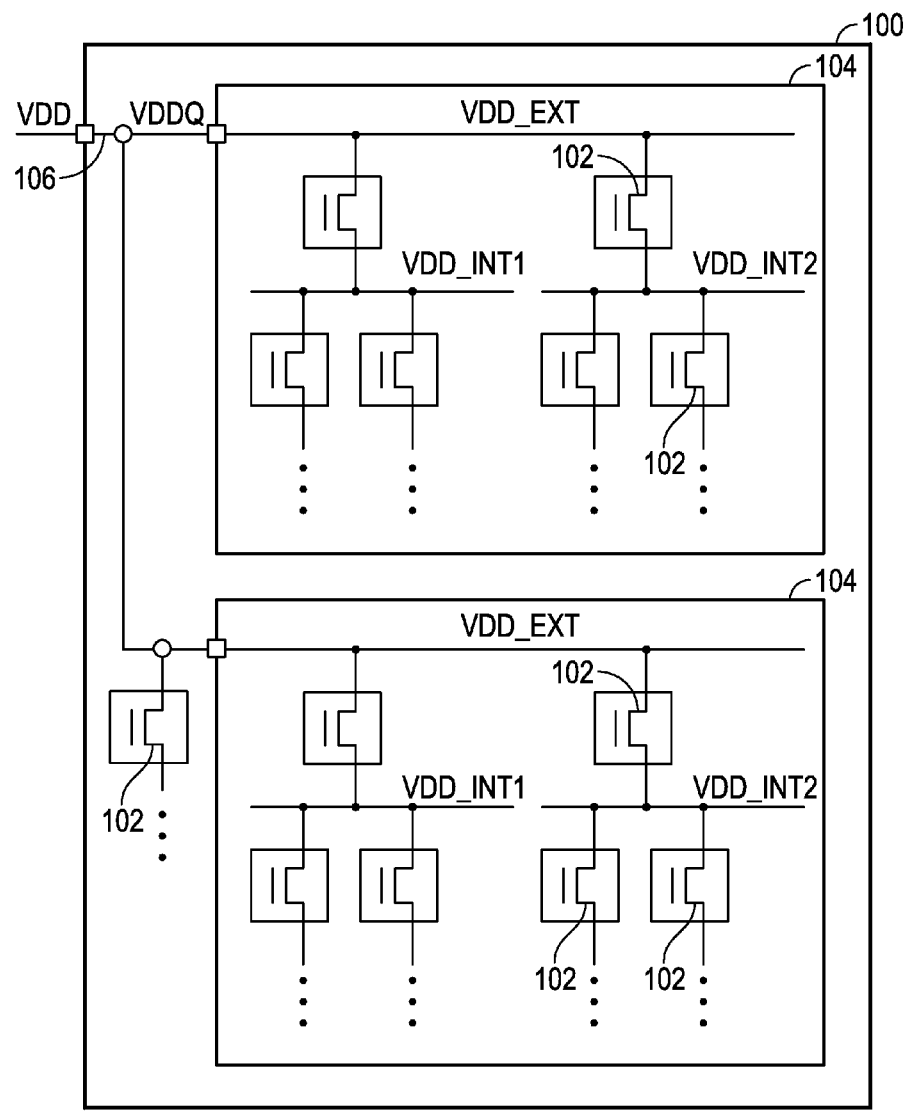
FIG. 1 is an electrical schematic of a portion of a semiconductor device of one embodiment showing a plurality of transistors for computer modeling.
Figure 2:
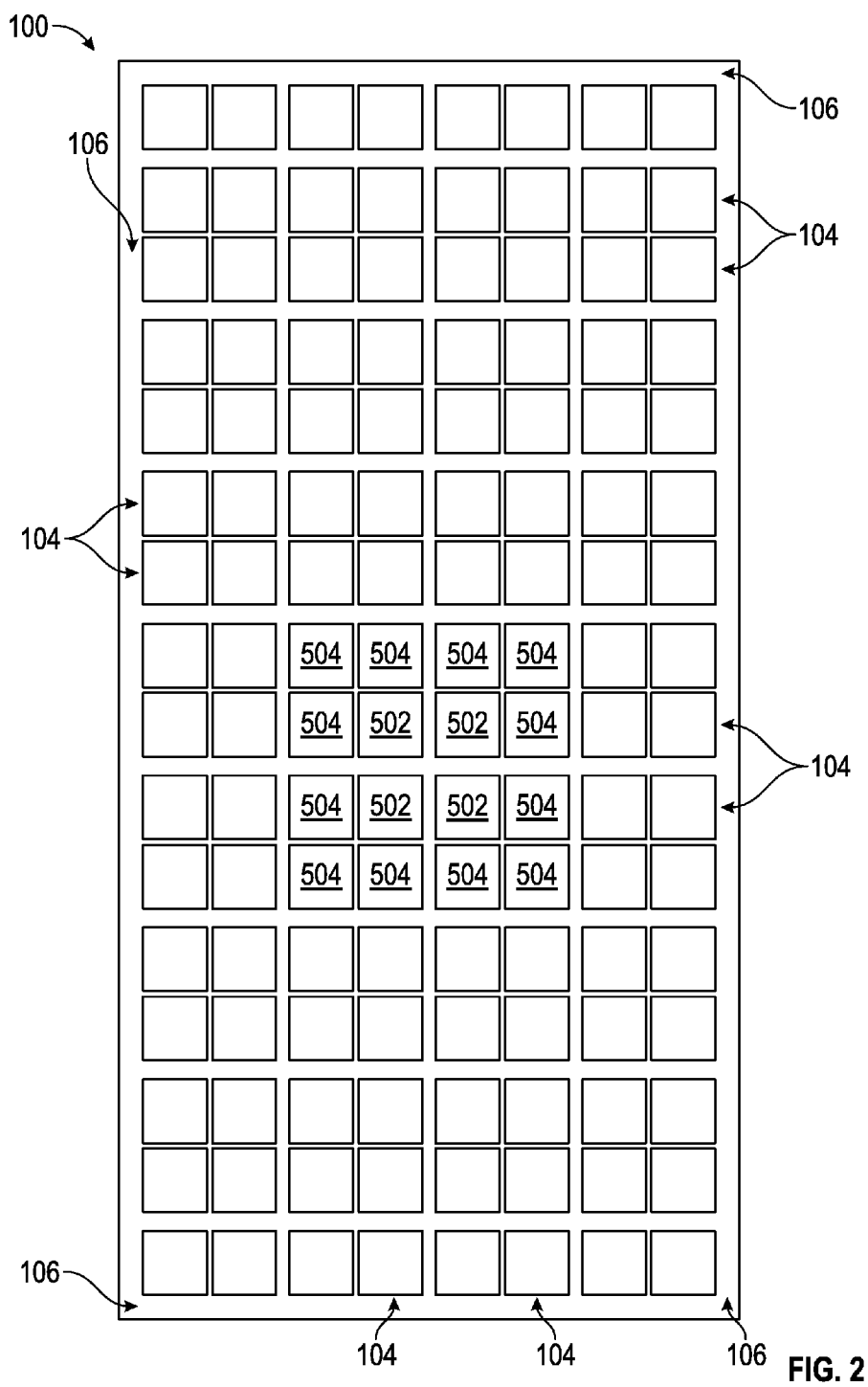
FIG. 2 is a top view of the semiconductor device according to one embodiment.

One embodiment of a semiconductor device 100 is shown in FIGS. 1 and 2. Specifically, FIG. 1 shows a partial schematic diagram of the semiconductor device 100. In this particular embodiment, the semiconductor device 100 is a memory module (not separately numbered) for the storage of electronic data. More specifically, the semiconductor device is a static random-access memory (SRAM) module.

However, in other embodiments, the semiconductor device 100 may perform other functions, besides storing data. For instance, the semiconductor devices 100 described herein may include, but are certainly not limited to, logic devices, embedded circuits, and mixed signal designs.

The semiconductor device 100 of the exemplary embodiment includes a plurality of transistors 102. The transistors 102 are field-effect transistors ("FETs") and more specifically metal-oxide-semiconductor field-effect transistors ("MOSFETs"). However, the semiconductor device 100 may include other types of transistors 102 as well as other types of electronic components, as is well appreciated by those skilled in the art.

The transistors 102 of the semiconductor device 100 may be grouped into a plurality of blocks 104. The blocks 104 may correspond to the physical layout and/or placement of the transistors 102 as part of the semiconductor device 100, as shown in FIG. 2.

Figure 3:
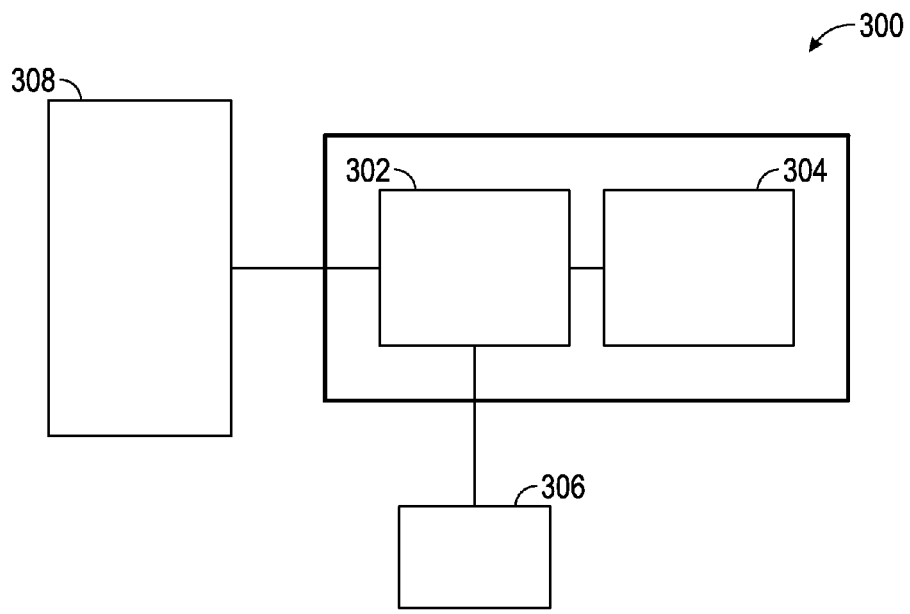
FIG. 3 is a block diagram illustrating a computer system configured to compute IR drop in the semiconductor device.

Referring now to FIG. 3, an exemplary computer system 300 may be utilized to compute IR drop in the semiconductor device 100. The term "IR drop" means "voltage drop", as is appreciated by those skilled in the art. In the illustrated embodiments, computing of the IR drop refers to calculating an expected or anticipated IR drop across the various components, e.g., the transistors 102, of the semiconductor device 100, and the semiconductor device 100 as a whole. This is achieved by utilizing software simulating the various interconnections of the components, as described in greater detail herein.

The computer system 300 includes a processor 302 capable of performing calculations and/or executing instructions, i.e., running a software program. The computer system 300 may also include a memory 304 in communication with the processor 302 for storing data and transferring such data to and from the processor 302. Examples of a suitable memory 304 include, but are not limited to, random-access memory, read only memory, flash memory, and a hard disk drive. The computer system 300 may further include at least one input device 306 and at least one output device 308. Examples of the input device 306 include, but are not limited to, a network communications apparatus, a keyboard, a mouse, and a touchscreen display. Examples of the output device 308 include, but are not limited to, the network communications apparatus, a display, and a printer.

Figure 4:
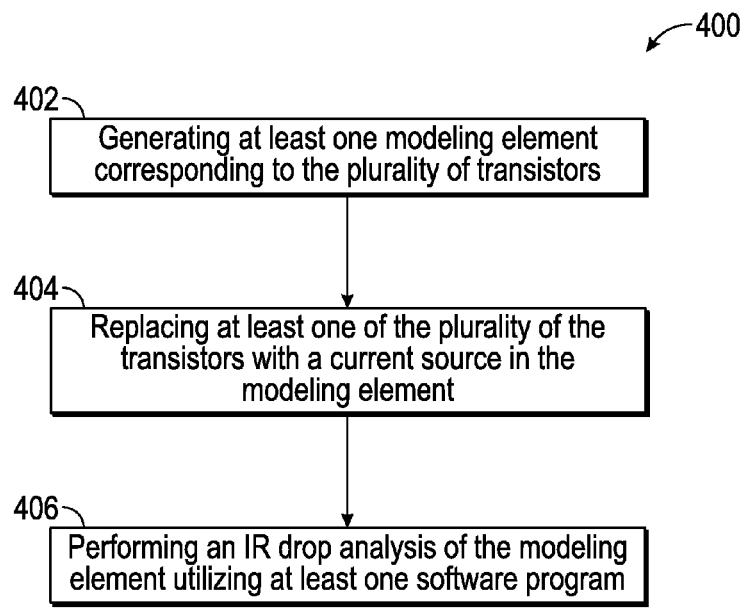
FIG. 4 is a flowchart illustrating a method of computing IR drop in the semiconductor device according to one embodiment.

One embodiment of a method 400 of computing IR drop in a semiconductor device 100 is shown in FIG. 4. The method 400 may be performed utilizing the computer system 300 described above. However, other suitable computing techniques may alternatively be utilized to implement the methods 400 described herein.

The method 400 includes, at label 402, generating at least one modeling element (not shown) corresponding to the plurality of transistors 102. The modeling element may be implemented as a computer data file (not shown). The computer data file provides information related to the transistors 102 or other components of the semiconductor device 100 for use by a computer program. For example, the computer data file may include data regarding interconnection of the transistors 102 and/or electrical characteristics of the transistors 102. These electrical characteristics may include voltage drop across the transistors 102 in various states, resistance, etc., as is appreciated by those skilled in the art. The method 400 may also include (not shown) generating at least one modeling element corresponding to electronic components other than the transistors 102. Once generated, the at least one modeling element may be stored in the memory 304 for use by the processor 302.

Figure 5:
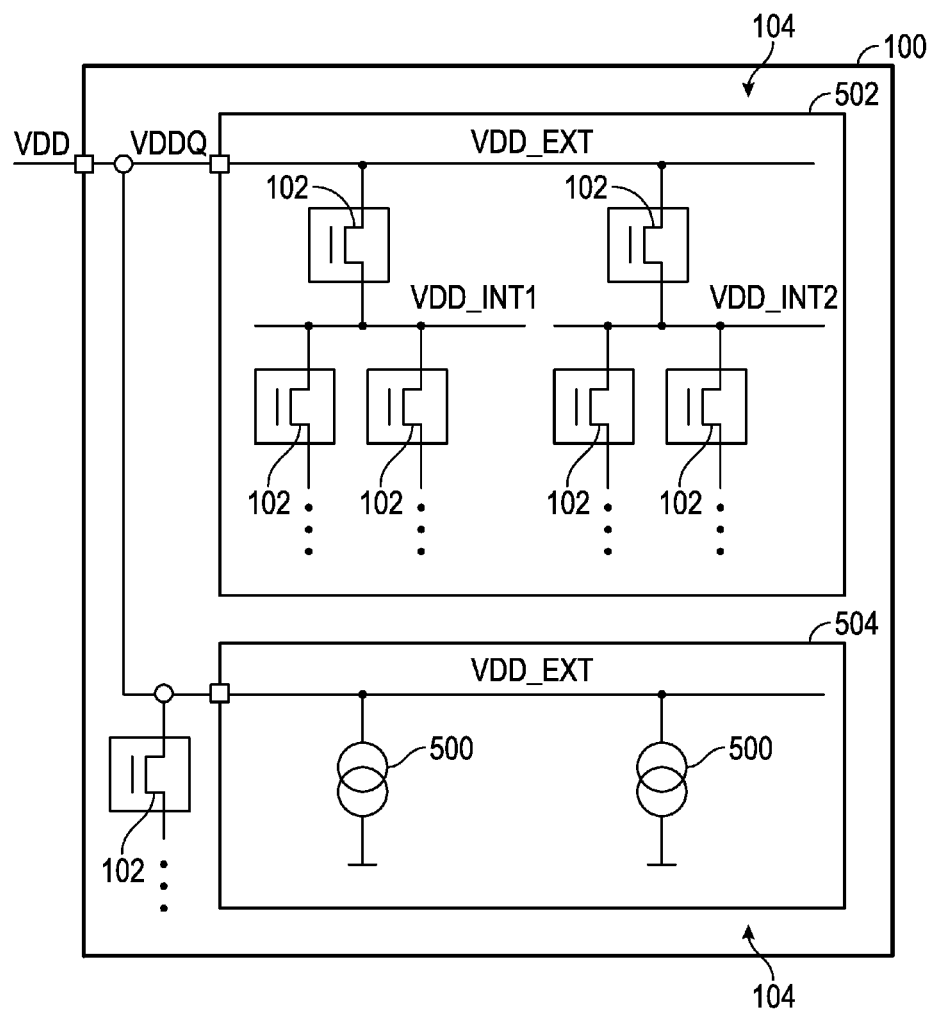
FIG. 5 is an electrical schematic of the portion of the semiconductor device of FIG. 1 according to one embodiment with current sources replacing some of the transistors for computer modeling.

One problem with processing the modeling elements, e.g., performing an IR drop analysis, is that such processing may be overly cumbersome and time consuming. Some of the fine detail required in modeling each and every transistor 102 of the semiconductor device 100 may not be absolutely necessary. Therefore, in one embodiment, the method 400 includes, at label 404, replacing at least one of the plurality of the transistors 102 with a current source 500 in the modeling element. A schematic representation of such a replacement is shown in FIG. 5 with comparison to the schematic representation of FIG. 1. In the embodiment illustrated in FIG. 5, a plurality of transistors 102 is replaced with at least one current source 500. Even more specifically, a plurality of current sources 400 are utilized, each current source 500 replacing a plurality of transistors 102 in the modeling element.

Figure 6:
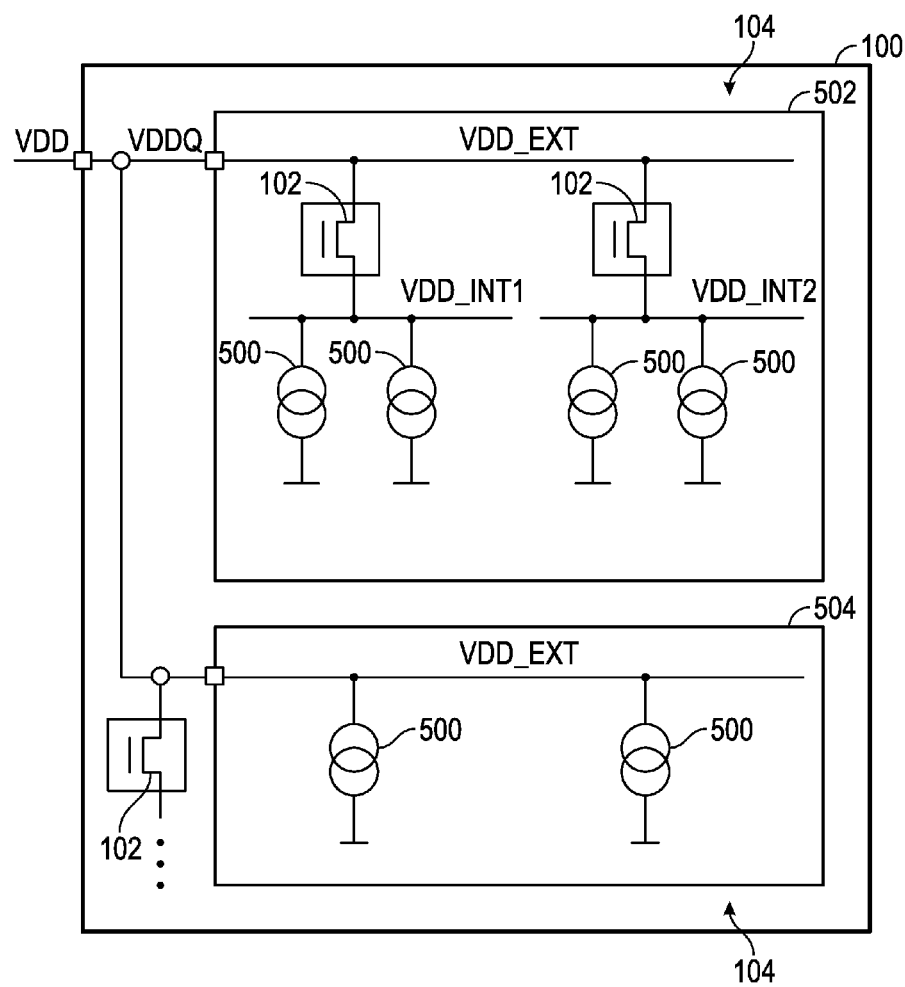
FIG. 6 is an electrical schematic of the portion of the semiconductor device of FIG. 1 according to one embodiment with current sources replacing additional transistors for computer modeling.
Figure 7:
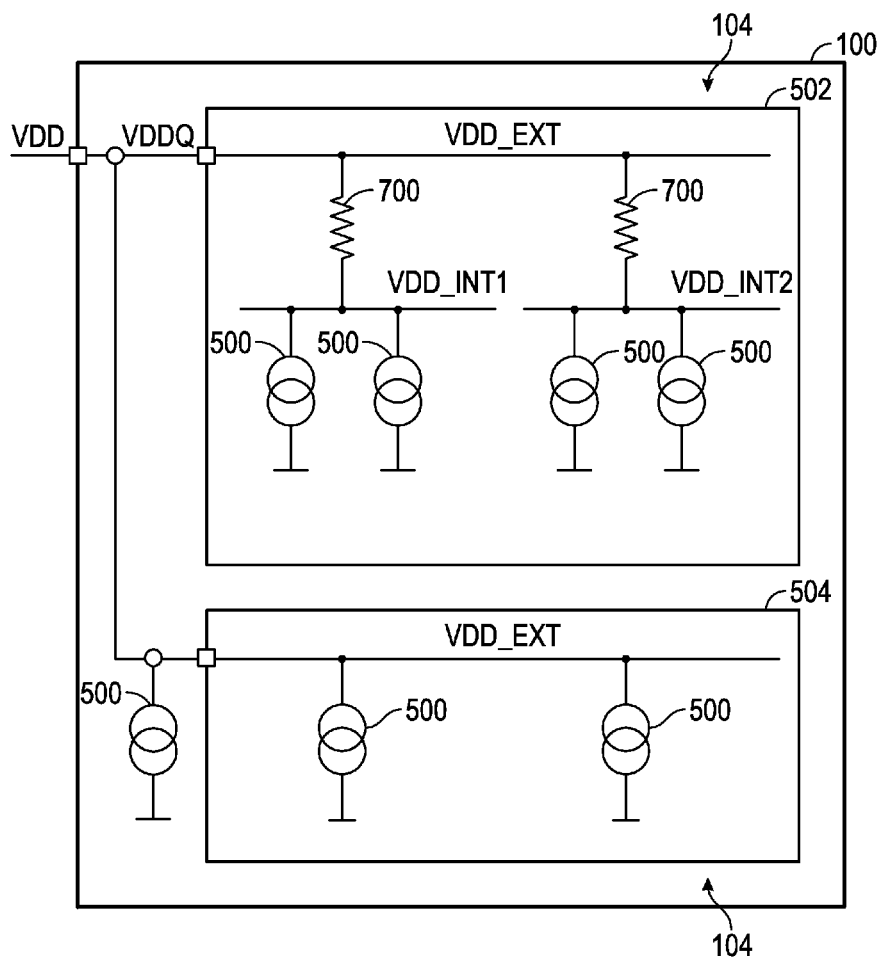
FIG. 7 is an electrical schematic of the portion of the semiconductor device of FIG. 1 according to one embodiment with current sources and resistors replacing each transistor for computer modeling.

Other possible techniques for replacing transistors 102 are shown in FIGS. 6 and 7. The embodiment shown in FIG. 6 builds on the replacements shown in FIG. 5 and shows replacement of single transistors 102 with current sources 500. The embodiment shown in FIG. 7 builds on the replacement shown in FIG. 6 and shows replacements of other transistors 102 by either current sources 500 or resistors 700. Specifically, a resistor 700 is modeled if the transistor being replaced is connected to other current sources 500.

Referring again to FIG. 4, the method 400 further includes, at label 406, performing an IR drop analysis of the modeling element utilizing at least one software program. Performing an IR drop analysis includes, but is not limited to, calculating an IR drop across one or more components modeled in the modeling element. In one embodiment, a plurality of software programs, supplied by Mentor Graphics, headquartered in Wilsonville, Oreg., and Apache Design, Inc., a subsidiary of ANSYS, Inc., located in San Jose, Calif., are utilized to perform the IR drop analysis. However, it should be appreciated that the systems and methods described herein may utilize software programs other than those specifically listed herein.

By replacing one or more transistors 102 with the current source 500 and/or resistors 700, processing of the modeling element, i.e., performing the IR drop analysis, may be performed faster and with less computer resources, e.g., processor 302 time and memory 304, then processing the IR drop analysis with each and every transistor 102 modeled in the modeling element.

To further illustrate practical techniques of implementing the method 400, the blocks 104 of transistors 102 may be categorized depending on the whether a more detailed IR drop analysis of the transistors 102 in the block 104 is required or whether a less detailed IR drop analysis may suffice. Accordingly, with reference again to FIG. 5, the blocks 102 may be categorized as a "fine block" 502, where a more detailed IR drop analysis is performed, or as a "coarse block" 504, where a less detailed IR drop analysis is performed.

Figure 8:
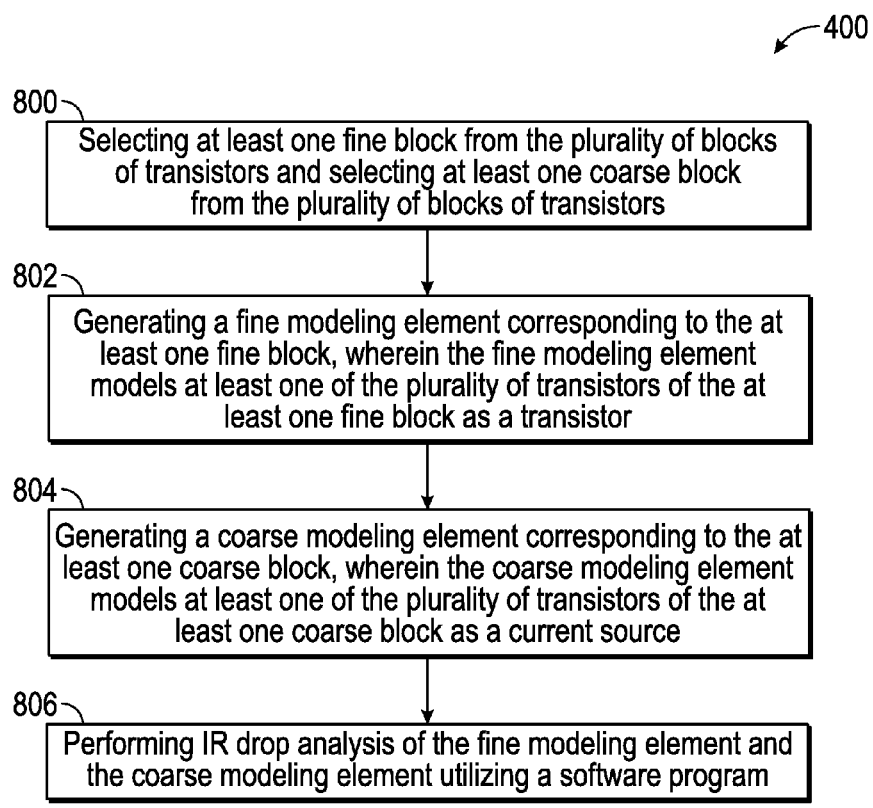
FIG. 8 is a flowchart illustrating the method of computing IR drop in the semiconductor device according to another embodiment.

As such, and with reference to FIG. 8, the method 400 may include, at label 800, selecting at least one fine block 502 from the plurality of blocks 104 and selecting at least one coarse block 504 from the plurality of blocks 104. Examples of criteria that may be considered in the selection of the fine and coarse blocks 502, 504 are provided below.

For instance, selecting at least one coarse block 504 may include selecting at least one of the plurality of blocks 104 disposed adjacent a voltage rail 106. For instance, if a block 104 is disposed in close proximity to the voltage rail 106, which typically provides a steady voltage to the blocks 102, then the block 102, in this instance, may be selected as a coarse block 504.

Selecting at least one coarse block 504 may also include selecting at least one block 102 of a lowest design level. For instance, those skilled in the art appreciate that certain blocks 102 of semiconductor devices may be categorized based on their functionality, commonly referred to as their "design level". A block of minimum importance, i.e., a block 102 at the lowest design level, may be selected as a coarse block 504.

In one embodiment, selecting the at least one fine block 502 may include selecting at least one block 104 where a highest IR drop is expected, i.e., where the highest magnitude of voltage drop is expected to occur. Utilizing an understanding of IR drops in a semiconductor device 100 and/or past experience, those skilled in the art are able to determine which block of the semiconductor device 100 will likely incur the largest IR drop. However, the selection of at least one fine block 502 is not limited to merely one block 104. It should be appreciated that multiple fine blocks 502 may be selected. Furthermore, it should also be appreciated that the selection of the at least one fine block 502 need not occur where the highest IR drop is expected, but at any location, depending on the needs and nature of the particular IR drop analysis being performed.

The at least one fine block 502 may be surrounded by a plurality of coarse blocks 504. As such, the method 400, in one embodiment, may also include selecting at least one fine block 502 as a block 104 that is surrounded by a plurality of coarse blocks 504. For example, the fine blocks 502 of the embodiment shown in FIG. 2 are completely surrounded by coarse blocks 504. However, it should be appreciated that in other embodiments, the selection of the fine and coarse blocks 502, 504 may be in any configuration based on the needs and nature of the particular IR drop analysis being performed.

Referring again to FIG. 8, the method 400 of this embodiment includes, at label 602, generating a fine modeling element (not shown) corresponding to at least one fine block 502 of the plurality of blocks 104. The fine modeling element models at least one of the plurality of transistors 102 of the at least one fine block 502 as a transistor 102. In one implementation, the fine modeling element models each of the plurality of the transistors 102 of the at least one fine block 502 as a transistor 102. That is, each and every transistor 102 in the fine block 502 is modeled as a transistor 102.

The method 400 of this embodiment also includes, at label 804, generating a coarse modeling element (not shown) corresponding to at least one coarse block 504 of the plurality of blocks 104. The coarse modeling element models at least one of the plurality of transistors 102 of the at least one coarse block 504 as a current source 500.

In the exemplary embodiments, the coarse modeling element models a plurality of the plurality of transistors 102 of the at least one coarse block 504 as at least one current source 500. Said another way, multiple transistors 102 are modeled as a current source 500. More specifically, in the exemplary embodiment shown in FIG. 5, the coarse modeling element models each of the plurality of transistors 102 of the at least one coarse block 504 as at least one current source 500. Said another way, each and every transistor 102 is replaced with a current source 500. Furthermore, multiple current sources 500 may be implemented to replace multiple transistors 102, as is shown in comparing FIG. 5 to FIG. 1. In other embodiments, such as those shown in FIGS. 6 and 7, transistors 102 of the at least one fine block 502 may also be replaced with current sources 500 and/or resistors, as described above. However, in further embodiments, only selected transistors 102 may be replaced.

Once generated, the fine and coarse modeling elements may be received for analysis by the processor 302. For instance, the modeling elements may be received and stored in the memory 304.

Referring again to FIG. 8, the method 400 of this embodiment further includes, at label 806, performing IR drop analysis of the at least one fine modeling element and the at least one coarse modeling element utilizing a software program. Said another way, the IR drop is calculated across the block represented by each fine modeling element and each coarse modeling element. The method 400 may further include calculating the IR drop As stated above, utilizing the method 400 provides a more efficient and faster running IR drop analysis. For example, in one experiment, an IR drop analysis was performed on a semiconductor device 100 where all of the transistors 102 are modeled as transistors. The exemplary semiconductor device 100 included 128 blocks. In this experiment, the IR drop analysis ran for 8 hours and 59 minutes, required 288 gigabytes (GB) of memory 304 at peak usage, and calculated a maximum IR drop of 15.1 mV. In contrast, in another experiment, the IR drop analysis was performed in accordance with the method 400 of FIG. 8, where all but four blocks 104 were designated as coarse blocks 504, as shown in FIG. 2. In this experiment, the IR drop analysis ran for only 2 hours and 11 minutes, required only 38 GB of memory 304 at peak usage, and calculated a maximum IR drop of 15.7 mV.

The method 400 may further include (not shown), calculating an IR drop of the semiconductor device 100 based on the IR drop analysis of the fine modeling element and the coarse modeling element. That is, the IR drop calculated for each block 104 may be combined together to determine the IR drop for the entire device 100.

The method 400 may also include reporting the IR drop of the individual blocks 104 and/or the semiconductor device 100 to a user. For instance, the IR drop of the semiconductor device 100 may be displayed on a display of the output device 308 for use by the user. The IR drop may also be written to the memory 304 or transferred to an external database (not shown), such that IR drops of multiple semiconductor devices 100 that are being simulated may be compared.

A computer program product, i.e., a software program, may also be realized to implement the methods described above. In one embodiment, the computer program product includes a fine modeling element corresponding to at least one fine block of the plurality of blocks. As stated previously, the fine modeling element models at least one of the plurality of transistors of the at least one fine block as a transistor. The computer program product may further include a coarse modeling element corresponding to at least one coarse block of the plurality of blocks. As also stated previously, the coarse modeling element models at least one of the plurality of transistors of the at least one coarse block as a current source. The computer program product may also include an IR drop analysis routine. The IR drop analysis routine is configured to compute the IR drop of the fine modeling element and the IR drop of the coarse modeling element. The IR drop analysis routine is further configured to compute the IR drop of the entire semiconductor device based on the IR drops of the fine and coarse modeling elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method of computing voltage (IR) drop in a semiconductor device divided into a plurality of blocks, wherein each block includes a plurality of transistors, said method comprising:

generating a fine modeling element corresponding to at least one fine block of the plurality of blocks, wherein the fine modeling element models at least one of the plurality of transistors of the at least one fine block as a transistor;

generating a coarse modeling element corresponding to at least one coarse block of the plurality of blocks, wherein the coarse modeling element models at least one of the plurality of transistors of the at least one coarse block as a current source; and performing IR drop analysis of the fine modeling element and the coarse modeling element utilizing a software program running on a computer.

2. The method as set forth in claim 1, further comprising calculating an IR drop of the semiconductor device based on the IR drop analysis of the fine modeling element and the coarse modeling element.

3. The method as set forth in claim 2, further comprising reporting the IR drop of the semiconductor device to a user.

4. The method as set forth in claim 1, wherein the fine modeling element models each of the plurality of the transistors of the at least one fine block as a transistor.

5. The method as set forth in claim 1, wherein the coarse modeling element models a plurality of the plurality of transistors of the at least one coarse block as at least one current source.

6. The method as set forth in claim 1, wherein the coarse modeling element models each of the plurality of transistors of the at least one coarse block as at least one current source.

7. The method as set forth in claim 1, further comprising selecting the at least one fine block as the at least one block where a highest IR drop is expected.

8. The method as set forth in claim 1, further comprising selecting the coarse block as one of the plurality of blocks disposed adjacent a voltage rail.

9. The method as set forth in claim 1, wherein the at least one of the plurality of transistors of the second block modeled as a current source are at a lowest design level.

10. The method as set forth in claim 1, wherein the at least one fine block is surrounded by a plurality of coarse blocks.

11. A method of computing voltage (IR) drop in a semiconductor device divided into a plurality of transistors, said method comprising:

generating a modeling element corresponding to the plurality of transistors;

selecting at least one of the transistors to be replaced with a current source in the modeling element based on at least one of where a highest IR drop is expected, the disposition of the transistors being adjacent to a voltage rail, and the lowest design level of the transistors;

replacing the selected at least one of the plurality of the transistors with at least one current source in the modeling element;

performing IR drop analysis of the modeling element utilizing a software program running on a computer to calculate the IR drop of the semiconductor device.

12. The method as set forth in claim 11, further comprising reporting the IR drop of the semiconductor device to a user.

13. The method as set forth in claim 11, wherein replacing at least one of the plurality of transistors with a current source comprises replacing a plurality of transistors of the plurality of transistors with at least one current source.

14. The method as set forth in claim 11, wherein replacing at least one of the plurality of transistors with a current source comprises replacing a plurality of transistors of the plurality of transistors with a plurality of current sources.

15. A system for computing voltage (IR) drop in a semiconductor device divided into a plurality of blocks, wherein each block includes a plurality of transistors, said system comprising:

a processor; and a memory in communication with the processor, said memory configured to receive a fine modeling element corresponding to at least one fine block of the plurality of blocks, wherein the fine modeling element models at least one of the plurality of transistors of the at least one fine block as a transistor, and receive a coarse modeling element corresponding to at least one coarse block of the plurality of blocks, wherein the coarse modeling element models at least one of the plurality of transistors of the at least one coarse block as a current source;

said processor configured to perform IR drop analysis of the fine modeling element and the coarse modeling element utilizing a software program.

16. The system as set forth in claim 15 wherein said processor is further configured to calculate an IR drop of the semiconductor device based on the IR drop analysis of the fine modeling element and the coarse modeling element.

17. The system as set forth in claim 16 further comprising an output device in communication with said processor and configured to report the IR drop of the semiconductor device to a user.

* * * * *